United States Patent [19]

Ellis

[11] 4,283,303
[45] Aug. 11, 1981

[54] PROCESS FOR MANUFACTURE OF STABLE SODIUM DITHIONITE SLURRIES

[75] Inventor: Leonard C. Ellis, Chesapeake, Va.

[73] Assignee: Virginia Chemicals Inc., Norfolk, Va.

[21] Appl. No.: 156,744

[22] Filed: Jun. 5, 1980

[51] Int. Cl.$^3$ .............................................. C01B 17/66
[52] U.S. Cl. ..................................... 252/188; 423/265; 423/515
[58] Field of Search ....................... 423/515, 516, 265; 252/188

[56] References Cited

U.S. PATENT DOCUMENTS

| | | | |
|---|---|---|---|
| 2,226,576 | 12/1940 | Park et al. | 423/515 |
| 3,804,944 | 4/1974 | Kise et al. | 423/515 X |
| 3,839,218 | 10/1974 | Owen et al. | 423/515 X |
| 3,985,674 | 10/1976 | Ellis et al. | 423/515 X |
| 4,100,098 | 7/1978 | Magan | 423/515 X |

FOREIGN PATENT DOCUMENTS

| | | | |
|---|---|---|---|
| 1205504 | 11/1965 | Fed. Rep. of Germany | 423/515 |
| 20580 | 12/1907 | United Kingdom | 423/515 |

OTHER PUBLICATIONS

Dulepov et al. "Zhurmal Prikladnoi Khimii," vol. 49, No. 5, pp. 1135–1137, May, 1976.

*Primary Examiner*—Jack Cooper
*Attorney, Agent, or Firm*—Depaoli & O'Brien

[57] ABSTRACT

Substantially stable slurries containing 30–35% by weight of sodium dithionite are manufactured by evaporating sodium dithionite solutions while maintaining the heating medium at 220°–250° F. and the solution and slurry at 110°–155° F. under a vacuum of at least 25 inches Hg and by promptly cooling the resultant slurry while agitating it. The vacuum is preferably 26.5–27.5 in. Hg. At 4–5% by weight of the sodium dithionite and preferably at 4.3% by weight, NaOH is preferably added to the solution or alternatively to the slurry, immediately after evaporation. A chelator is preferably added to the solution to prevent metal contamination thereof. Zinc-derived sodiation liquor is the preferred sodium dithionite solution.

9 Claims, No Drawings

PROCESS FOR MANUFACTURE OF STABLE SODIUM DITHIONITE SLURRIES

BACKGROUND OF THE INVENTION

1. Field of the Invention

This invention relates to manufacture of sodium dithionite and particularly relates to preparation of sodium dithionite in an aqueous slurry form having adequate stability for industrial bleaching operations. More particularly, it relates to such manufacture directly from commercially prepared solutions of sodium dithionite.

2. Review of the Prior Art

Sodium dithionite, commonly termed sodium hydrosulfite and less correctly sodium hyposulfite, is a powerful reducing agent that has long been used for bleaching, particularly for bleaching textiles and wood pulps such as groundwood and semichemical pulps. However, the stability of sodium dithionite has long been a problem.

Sodium dithionite has usually been manufactured by significantly different processes that are alternatively based on zinc dust, sodium formate, sodium borohydride, or sodium bisulfite (electrolytic). The products from these processes are herein respectively identified as zinc-derived, formate-derived, borohydride-derived, or electrolytically-derived sodium dithionite. Because the zinc process produces zinc dithionite which is no longer ecologically acceptable, the zinc dithionite is converted to sodium dithionite by adding sodium hydroxide or sodium carbonate, whereby zinc hydroxide or zinc carbonate is precipitated and removed by filtering. The filtrate containing the sodium dithionite is termed sodiation liquor.

Sodium dithionite from any of these four processes is potentially available on a commercial basis in the form of powders, solutions, or slurries. When anhydrous sodium dithionite crystals are dissolved under either aerobic or anerobic conditions, to make a large quantity of aqueous solution, the resulting solution cannot be stored for use over a long period of time. Due to hydrolytic decomposition at the natural pH of a sodium dithionite solution, decomposition will proceed rapidly from that point by self-propagation because the decomposition products create an acidic condition which accelerates the decomposition.

Under normal storage conditions, commercial grades of powdered sodium dithionite can safely be held without appreciable decomposition for long periods of time, if kept dry. But if moisture reaches sodium dithionite in confined places, such as stored drums or storage bins, exothermic decomposition reactions can cause self-ignition of the decomposition products and even explosions if the sodium dithionite is confined in a gastight space, such as a drum. Moreover, production of heat by this decomposition can release large volumes of sulfurous gases and can cause fires which are very difficult to extinguish.

More specifically, it has been reported that dry sodium dithionite can decompose in 46-200 minutes by adding 3% of water onto its surface at room temperature in an insulated container, and such decomposition can occur in one to two minutes by adding 0.7% of water onto its surface at 133° C. Such contact with moisture can occur because of moisture from the air, residual moisture from incomplete drying of a product during manufacture, or accidental wetting of the material. Further, decomposition and fires can be caused, without water contact, by heating to temperatures of 135°–190° C.

As an example of many attempts to avoid these difficulties, U.S. Pat. No. 3,054,658 proposes the addition of 0.1–45% by weight of a sodium or potassium salt of a carboxylic acid (e.g., formic acid to stearic acid) and a benzoic acid, which may be substituted in the ring by an amino, hydroxy, or methyl group (e.g., p-amino benzoic, salicylic, and o-, m-, p-toluic acid) to form a stabilized mixture which at the one percent addition level does not begin to decompose after more than one hour as compared to 1.5 minutes without an added stabilizing agent.

It is industrially significant that while powdered sodium dithionite is dissolving to form a bleaching solution, it tends to decompose at an appreciable rate. Moreover, the commercially prepared solutions of sodium dithionite also tend to decompose during the five to seven days that are required for transportation from the place of manufacture to a textile or pulp mill and for onsite storage within the mill. Such decomposition can proceed by aerobic reactions, or by anaerobic reactions when air is completely excluded.

As an example of a large number of attempts to protect sodium dithionite solutions during transportation and storage thereof, U.S. Pat. No. 3,985,674 provides sodium dithionite bleaching solutions for groundwood pulps which require no additional chemicals for pH adjustment prior to direct application to the pulps, by using at least four additives selected from the following: a chelating agent, zinc dithionite, zinc sulfate, sodium carbonate, sodium hydroxide, sodium tripolyphosphate, sodium phosphate, and sodium metaborate. Chelating agents include nitrilo triacetic acid (NTA) trisodium salt and ethylene diamine tetraacetic acid (EDTA) tetrasodium salt. The solutions are cool stable at 50° F. for at least five days with less than 5% decomposition of the sodium dithionite.

It is an economic reality that powdered sodium dithionite is expensive to manufacture. It is also true that its pulp-bleaching purchasers, who must store it under the dark, warm, and humid conditions that prevail in a pulp and paper mill, have to expend care and expense to utilize oldest drums first, to watch for and utilize machine-damaged and rust-damaged drums without delay, and to provide fire-fighting protection that might otherwise be unnecessary. In brief, powdered sodium dithionite is not the ideal form for this compound under some industrial conditions.

It is furthermore another economic reality that commercially available solutions of sodium dithionite are expensive to transport because they are typically at concentrations of 5–13.5%, preferably 12–13.5%, when combined with suitable additives. Thus, the transport of about seven times as much water as product tends to cause the sale of this commodity to become distance-dependent. In consequence, slurries have seemed to offer an inviting means to avoid or at least to minimize the cost and storage difficulties associated with solution forms of sodium dithionite, without decreasing the convenience that a purchaser derives from solutions.

However, the economical preparation, stabilization, handling, and shipping of such slurries is not simple. In fact, after considering the variety of processes that are available for manufacturing sodium dithionite, including the indigenous by-products, crystal structures, and the like, the complexities of the concept are readily appreciated. Moreover, slurries have not been as widely investigated nor as commercially utilized as other forms of sodium dithionite.

U.S. Pat. No. 3,536,445 describes a process for making sodium dithionite from sodium-zinc alloy by initially producing zinc dithionite and then converting it to sodium dithionite by adding caustic soda. After removal of the zinc hydroxide by filtration, the dihydrate of sodium dithionite is "salted out" of the mother liquor with sodium chloride and alcohol to form a slurry.

U.S. Pat. No. 3,804,994 gives some stability storage data for 30% slurries (18.5% formate-derived and 11.5% zinc-derived sodium dithionite) containing 1–8% caustic soda (dithionite basis). Tests showed that these slurries required frequent agitation to prevent caking and handling difficulties. None of the slurries survived for 20 days at 67° F. before exceeding 10% decomposition. Most survived the 30-day test at 50° F., and all were successful at 35° F. for thirty days, with most showing less than five percent decomposition for the test period. It was found that a 10% dithionite solution was more easily handled than a solution containing 15% or more of sodium dithionite which developed needle-like crystals of sodium dithionite dihydrate which were difficult to redissolve. Moreover, the stability was inversely related to the dithionite concentration.

U.S. Pat. No. 3,839,217 shows that by reducing the particle size of the sodium dithionite crystal and/or introducing a suspending or thickening agent into a liquid containing the crystals, such as alcoholic brine, it is possible to form a fluent, homogeneous, pourable dispersion of the solid dithionite particles which is chemically and physically stable for long periods of time, provided that a material, such as the salt in the brine and/or an alcohol, be present which suppresses the dissolution of the dithionite. The majority of the particles should be about 0.6–0.8 micron. Methylcellulose, polyvinyl alcohol, and other common thickening, dispersing, or suspending agents can be used.

U.S. Pat. No. 3,839,218 provides a method for maintaining a dispersion of crystalline zinc or alkali metal dithionite hydrate by continuous or periodic mechanical agitation so that the crystals can be stored for long periods without decomposition, the dispersing medium being aqueous or non-aqueous and containing a material which suppresses dissolution of the dithionite solids. The pH of the liquid must be at least 6.5, the viscosity of the dispersion must be below about 50,000 centipoises, and the suppressing material may be a water-soluble organic compound or a saturated brine or mixtures thereof.

In general, the slurries of U.S. Pat. Nos. 3,839,217 and 3,839,218 are potentially economically feasible for processors which produce sodium dithionite dihydrate crystals in slurry form by "salting out" techniques before filtering, dehydrating, and drying to produce anhydrous sodium dithionite, such as by the method of U.S. Pat. No. 3,936,445. However, it is at least inconvenient when anhydrous sodium dithionite is produced directly by precipitation from an aqueous methanol solution at a temperature above the dehydration point of a hydrated sodium dithionite, such as by the method of U.S. Pat. No. 4,127,642. In order to produce a slurry from such anhydrous sodium dithionite, it is necessary to dissolve the anhydrous powder in water and then to add a suppressant, an organic liquid, a buffer, and/or a suspending agent. Clearly, following this route to produce a slurry is expensive and awkward.

Therefore, because the formate process produces anhydrous sodium dithionite directly, shipping and sale of the formate-derived powder in air-and-moisture-free drums is preferable. But in the other processes, such as the zinc-derived process, wherein the dithionite is produced as an aqueous solution, additional steps are necessary to produce anhydrous sodium dithionite, such as: (1) treating the sodiation liquor with sodium chloride and ethanol to effect crystallization of the dihydrate and (2) drying the dihydrate. This salting-out procedure has been practiced for years in the zinc-derived process. However, it is preferable for many reasons to market the sodiation liquor, which contains sodium dithionite at 16–18% concentration, as a solution by diluting it to about 13% $Na_2S_2O_4$ and by adding a chelating agent and NaOH as a stabilizer. Thus, an economic impetus to create a process that can produce a slurry directly from the sodiation liquor is provided by the economics of shipping water in such solutions.

A continuous process for producing anhydrous sodium dithionite in a single stage is disclosed by Dulepov et al in Zhurnal Prikladnoi Khimii, Vol. 49, No. 5, pp 1135–1137, May 1976 (Russian). In this process, a sodium dithionite solution containing about 28% NaCl (dithionite basis) is evaporated under vacuum at a temperature above the point of conversion of the dihydrate into the anhydrous salt, so that the product separates out into a solid phase in the form of anhydrous crystals. A crystallization temperature of 58° C. (136° F.) is suitable. No stability information appears to be given except a storage decomposition rate of 0.0375% per minute at 58° C. (136° F.) within the evaporator.

In general, the prior art has prepared slurries of sodium dithionite and has merely added caustic soda to provide a sufficiently high pH but has not otherwise investigated the stabilities of dithionite slurries. Thus, while making such an investigation, it has been discovered that even in the presence of caustic soda and a chelator, stabilities were sometimes excellent and sometimes very poor. The borderline value for an acceptably stable slurry is herein defined as no more than 0.65%/day at a storage temperature of 35°–40° F. There is consequently a need for a method that will provide reproducably stable dithionite slurries, and there is further a need for a method that will produce such stable slurries without having to salt out the crystals.

SUMMARY OF THE INVENTION

It is accordingly an object of this invention to provide a process for producing sodium dithionite slurry directly from sodiation liquor in the zinc-derived process.

It is also an object to provide a dithionite slurry process wherein dithionite crystals are obtained from sodiation liquor without using additives to produce a salting-out effect.

It is still further an object to provide a dithionite slurry process wherein the sodium dithionite in the slurry is highly stable.

In accordance with these objects and the principles of this invention, a process is herein described which comprises concentrating the sodiation liquor by evaporation under vacuum. Evaporation can be conducted in any standard crystallizer or evaporator, such as wiped-film evaporators, vacuum crystallizers with recirculation or agitation, flash evaporators, forced-circulation evaporators, or long-tube vertical evaporators, for example. Moreover, the crystallizers or evaporators can be arranged in single effect or multiple effect. Operation can be batch-wise but is preferably continuous. Heating of the slurries may be conducted within the crystallizer or evaporator or may be conducted outside thereof while the slurries are circulated through the evaporative area. In addition, selective evaporation to a desired moisture content can be carried out in a spray drier, a fluidized-bed drier, or a centrifugal disk atomizer.

However, it has surprisingly been discovered that the fluid-film temperature is critical with respect to stability of the crystals even though it has negligible effect on recovery thereof. Without intending to be bound by a proposed theory, it is believed that when evaporating a sodium dithionite solution within a vessel such as a crystallizer, a chemical reaction occurs to form a catalytic material within the liquid film, adjacent to the metal surface of a vessel wall across which heat is being transferred to the solution, whenever the film is heated above a critical temperature. It is further believed that once this catalytic material forms, it remains in the slurry to cause or at least accelerate its decomposition. This temperature criticality is preferably measured within the sodiation liquor being heated, whether such heating is done prior to entering the evaporator or crystallizer or while under vacuum within the evaporator or crystallizer itself. This discovery is particularly surprising because higher temperatures should tend to minimize occlusion of water within the crystal nuclei.

It has specifically been ascertained that there are four critical conditions for evaporating sodiation liquor which are measurable in a practical way for estimating the temperature in the fluid film. These are, broadly, a slurry temperature of 110°–155° F., a jacket temperature of 220°–250° F., a vacuum of 20–30 inches Hg, and 4–5% caustic by weight, based on the sodium dithionite. Preferably, the ranges are 135°–145° F. in the slurry, 235°–240° F. in the heating jacket, 25–27 inches Hg as vacuum above the sodiation liquor, and 4.3% caustic by weight, based on the sodium dithionite.

This process is useful for preparing slurries of 20–45% sodium dithionite and more preferably about 30–40%. Surprisingly, it consistently gives at least about 93% recovery of sodium dithionite in the sodiation liquors, no matter what steam temperatures are utilized in the heating jacket. However, when the heating jacket is operated at more than about 250° F., stability of the recovered sodium dithionite seriously deteriorates.

Indeed, slurries decompose badly in storage even when prepared by holding the steam pressure at 30 psig (274° F.) and by varying only the vacuum between 20 and 27 inches Hg, so that the temperature within the evaporator changes over a wide range.

Even though this process uses the additives of the prior art, it has been found that these prior-art additives are not enough to ensure storage stability of sodium dithionite slurries produced thereby. Thus, the slurry compositions of the prior art, as presently known to be measurable, are satisfactory for the slurries of the present invention, but these slurries must have an appropriately limited process history, because they are characterized by a criticality as to storage stability that is preparation-dependent.

Although the process has been described with particular emphasis on zinc-derived sodium dithionite, it is to be understood that it is suitable for any dithionite manufacturing process which produces a dithionite solution as an intermediate or final product.

The sodiation liquors, treated with chelating agent and a suitable level of caustic soda, are preferably fed at rates of 60 to 100 pounds of solution per hour per square foot of heat transfer surface to produce slurries containing 25 to 40% sodium dithionite (100% basis). The efficiencies for recovering the sodium dithionite which are fed within this range average 94.6%, with a range of 88.2% to 100%.

No differences, from an efficiency standpoint, are indicated at caustic treatment levels of 0.0% to 4.3%, on an $Na_2S_2O_4$ basis, with a density range of 1.15 to 1.20 at 70°–75° F. Such slurries, as produced, tend to settle although the particle size therein appears to be less than 44 microns. Upon storage at 32° F. in half-gallon bottles, the slurries remain soft and redispersible, with no apparent "tombstoning" on the bottoms of the containers. It was also clearly demonstrated that agitation is necessary during cooling to prevent formation of a crusted, non-pumpable slurry.

During an extended test run with a wiped-film evaporator, it was demonstrated that a cake does not build up on the evaporator surface, whereby temperatures would increase to a point at which dithionite efficiencies would drop significantly, and, in fact, plots of the slurry condensate and steam condensate were linear.

Recovery efficiencies for $Na_2S_2O_4$ consistently averaged in the mid-90's for runs designed to produce zinc-derived sodium dithionite (Zn/dithionite) slurries at, or below, 40% $Na_2S_2O_4$. However, when attempts were made to reach the 45% dithionite level, slurries were obtained containing only 38–42% sodium dithionite and at significantly lower recovery efficiencies. Apparently, operating conditions that are required to increase concentrations above 40% $Zn/Na_2S_2O_4$ cause the product to "scorch" on the walls of the evaporator, thereby resulting in lower assay slurries and poor recovery efficiencies. Such a result is not surprising because a 45% $Zn/Na_2S_2O_4$ slurry typically contains about 60% total solids. When tested at the 40% Zn/dithionite level, losses are not so apparent as those noted when attempting to reach 45% dithionite. Nevertheless, there are potential problems involved when storing the 40% slurry, particularly at temperatures of 32°–34° F., because the slurry becomes gummy and does not readily re-disperse when agitated, total solids at this dithionite concentration being typically about 52–54%.

Preferred chelators that provide ligands for sequestering metals are various forms of nitrilo triacetic acid (NTA), such as monohydrated trisodium salt (NTA.-$Na_3.H_2O$), and various forms of ethylene diamine tetraacetic acid (EDTA), such as ethylene diamine tetraacetic acid tetrasodium salt (ETDA.$Na_4$). Other chelators include ethyleneglycol-bis(beta-aminoethyl ether)-N,N-tetraacetic acid, trisodium hydroxyethylethylenediaminetriacetate, hydroxyethylethylenetriacetic acid, ethylenediaminedi(orthohydroxyphenylacetic acid), sodium N,N'-dihydroxyethylglycine, and the pentasodium salt of diethylenetriaminepentaacetate. In general, any chelator that is operable in an aqueous solution having a pH of about 12 is suitable for the process of this invention.

DESCRIPTION OF THE PREFERRED EMBODIMENTS

Evaporative concentration of zinc-derived sodiation liquor was conducted in a thin-film processor, which has one square foot of evaporative surface in a horizontally disposed cylindrical chamber within which the shaft for the wiping unit is coaxially disposed. Incoming feed enters one end of the cylinder and concentrated solution or slurry is discharged from the other end. A surface condenser is disposed beyond the discharge outlet and enables condensed vapor to be collected.

Broadly, the preferred procedure is to add an alkali metal hydroxide to the sodiation liquor, producing a pH of at least about 12, and then to evaporate the sodiation liquor while maintaining the liquid-film temperature at 118°–176° F. under a vacuum of 20–27 inches of mercury to produce a slurry of 17–45% $Na_2S_2O_4$. The discharged slurry is cooled with agitation to a preferred storage temperature such as 35°–40° F.

In this wiped-film evaporator, preferred operating conditions are a feed rate of 80–95 pounds per hour, 1,000 rpm, a vacuum of 27 inches of mercury, and a steam pressure of 10 psig. Under these conditions, the discharged slurry is at 115° F., the body of the reactor is at 120° F., the steam temperature is at 239° F., and the water vapor is at 95°–97° F.

This process can be more readily understood by consideration of the following examples in which zinc-derived sodiation liquor, containing 15–17% sodium dithionite and modified with 1.7–4.3% caustic soda and 0.75% chelating agent (both on a $Na_2S_2O_4$ basis), was used as the feed material.

EXAMPLE 1

Initially, the wiped-film evaporator was operated at 1,000 rpm and a vacuum of 26.5–27.5 inches of Hg. Sodiation liquor, containing a chelating agent (Kelate 45, a trademark of Dan River) at 0.75% by weight on an $Na_2S_2O_4$ basis and NaOH at 1.7–2.1% by weight on a $Na_2S_2O_4$ basis, was continuously fed to the wiped-film evaporator to determine recovery efficiencies. Operating conditions were 117° F. in the evaporator and a feed rate of 76.7 pounds of sodiation liquor per hour. As a typical run, 31,080 grams of sodiation liquor, containing 1.9% NaOH (sodium dithionite basis) and 15.74% $Na_2S_2O_4$, were evaporated to produce a slurry, weighing 12,072 grams and containing 37.9±0.9% $Na_2S_2O_4$ by weight, and a condensate weighing 18,650 grams. Calculated recoveries were: 93.5% recovery of $Na_2S_2O_4$ and total recovery of 98.8%.

EXAMPLES 2-9

As shown in Table I, sodiation liquor, after adding 4.3–4.9% NaOH ($Na_2S_2O_4$ basis), was fed at a feed rate of 65–83 pounds per hour to the wiped-film evaporator. Steam temperature was held at 10–15 psig (239°–250° F.) and an evaporating pressure of 25–27 inches Hg to produce an evaporation temperature in the body of the liquor of 118°–140° F. The discharged slurry and condensed vapor from each run were recovered and weighed.

The slurries produced were cooled with agitation to 35°–40° F. and stored for 28–35 days. The $Na_2S_2O_4$ content of each slurry was then chemically determined, and the loss was calculated as a percentage per day of storage.

The results of Examples 2–9 are satisfactory storage tests, produced under operating conditions that fall within the preferred limits of less than 145° F. for the slurry and no more than 250° F. for the steam.

Most recovery efficiencies for $Na_2S_2O_4$ are at least within the desired 93–95% range. The losses of $Na_2S_2O_4$, with two exceptions, are less than 0.15% per day and are therefore extremely good. Although the reasons for high variability in test results are not known, scatter of such storage data is commonly experienced.

TABLE I

| Ex. No. | Feed Analysis[a] $Na_2S_2O_4$% | NaOH % of $Na_2S_2O_4$ | Operating Conditions of Evaporator Steam Temp °F. | Evap. Vac. in. Hg | Evap. Temp °F. | Feed Rate lbs/hr | Recoveries % $Na_2S_2O_4$ | Total | $Na_2S_2O_4$ %, in Slurries | Slurry Storage Data at 35–40° F. Time, days | $Na_2S_2O_4$ Loss, %/day |
|---|---|---|---|---|---|---|---|---|---|---|---|
| 2 | 14.90 | 4.3 | 239 | 27 | 118 | 83.1 | 90.8 | 97.8 | 33.3 | 35 | 0.13 |
| 3 | 14.90 | 4.3 | 239 | 25 | 140 | 65.0 | 92.4 | 99.8 | 29.5 | 35 | 0.08 |
| 4 | 14.49 | 4.9 | 239 | 27 | 136 | 75.0 | 96.5 | 99.4 | 25.9 | 28 | 0.13 |
| 5 | 15.85 | 4.6 | 250 | 27 | 136 | 73.9 | 93.4 | 100.2 | 37.2 | 28 | 0.08 |
| 6 | 14.36 | 4.9 | 250 | 27 | 140 | 76.0 | 100.3 | 102.2 | 29.1 | 28 | 0.57 |
| 7 | 15.23 | 4.7 | 250 | 27 | 131 | 77.3 | 93.8 | 101.0 | 29.6 | 29 | 0.03 |
| 8 | 15.10 | 4.9 | 250 | 27 | 134 | 78.1 | 91.5 | 100.2 | 28.2 | 28 | 0.54 |
| 9[b] | 15.10 | 4.9 | 250 | 27 | 133 | 77.0 | 94.0 | 98.8 | 28.8 | 28 | 0.11 |

[a]Kelate 45 added to feed at 0.075% of $Na_2S_2O_4$ except where noted.
[b]No chelator added to feed or slurry.

TABLE II

| Ex. No. | Feed Analysis[a] $Na_2S_2O_4$% | NaOH % of $Na_2S_2O_4$ | Operating Conditions of Evaporator Steam Temp °F. | Evap.Vac. in. Hg | Evap. Temp °F. | Feed Rate lbs/hr | Recoveries % $Na_2S_2O_4$ | Total | $Na_2S_2O_4$ %, in Slurries | Slurry Storage Data at 35–40° F. Time, days | $Na_2S_2O_4$ Loss, %/day |
|---|---|---|---|---|---|---|---|---|---|---|---|
| 10 | 14.90 | 4.3 | 239 | 20 | 172 | 38.1 | 94.5 | 96.9 | 37.1 | 35 | 2.9 |
| 11 | 13.82 | 5.2 | 239 | 25 | 156 | 75.1 | 93.0 | 101.2 | 19.9 | 28 | 2.04 |
| 12 | 13.82 | 5.2 | 239 | 23 | 162 | 75.3 | 94.7 | 93.9 | 19.2 | 14 | 1.98 |
| 13 | 13.82 | 5.2 | 239 | 20 | 172 | 73.8 | 96.6 | 81.7 | 17.3 | 28 | 1.75 |
| 14 | 16.09 | 4.4 | 259 | 25 | 153 | 73.3 | 82.6 | 100.5 | 24.7 | 28 | 2.68 |
| 15 | 16.09 | 4.4 | 259 | 23 | 163 | 74.1 | 90.7 | 96.8 | 25.0 | 28 | 1.75 |
| 16 | 16.09 | 4.4 | 259 | 20 | 176 | 74.0 | 85.9 | 80.2 | 22.1 | 1 | 100.0 |
| 17 | 15.77 | 4.3 | 273 | 27 | 124 | 92.1 | 91.0 | 98.3 | 40.2 | 29 | 3.4 |
| 18 | 15.77 | 4.3 | 273 | 25 | 145 | 93.4 | 97.9 | 100.4 | 31.3 | 29 | 3.4 |
| 19 | 15.77 | 4.3 | 273 | 20 | 167 | 88.7 | 94.6 | 100.5 | 28.6 | 29 | 3.4 |

[a]Kelate 45 added to feed at 0.75% of $Na_2S_2O_4$

TABLE III

| Ex. No. | Feed Analysis[a] | | Operating Conditions of Evaporator | | | | Recoveries % | | $Na_2S_2O_4$ %, in Slurries | Slurry Storage Data at 35–40° F. | |
|---|---|---|---|---|---|---|---|---|---|---|---|
| | $Na_2S_2O_4$ % | NaOH % of $Na_2S_2O_4$ | Steam Temp °F. | Evap. Vac. in. Hg | Evap. Temp °F. | Feed Rate lbs/hr | $Na_2S_2O_4$ | Total | | Time, days | $Na_2S_2O_4$ Loss, %/day |
| 20 | 15.26 | 4.6 | 259 | 27 | 136 | 75.6 | 97.4 | 97.5 | 35.1 | 28 | 0.17 |
| 21 | 15.72 | 5.0[b] | 239 | 27 | 127 | 77.1 | 92.6 | 99.3 | 27.9 | 28 | 0.65 |
| 22 | 15.72 | 0.0[c] | 239 | 26.5 | 135 | 77.1 | 93.1 | — | 26.7 | 28 | 2.62 |

[a]Kelate 45 added to feed at 0.75% of $Na_2S_2O_4$.
[b]After evaporation, NaOH added to slurry which turned black.
[c]Slurry foamed badly at discharge.

EXAMPLES 10–19

A similar group of tests is shown in Table II. These runs were interspersed with those in Table I and essentially vary only with respect to being outside of limits as to steam temperature and/or slurry temperature (believed to be essentially equivalent to liquid film temperature). The losses of $Na_2S_2O_4$, as percent/day, are drastically higher than those shown in Table I. It appears that the stability of the sodium dithionite is sensitive to steam temperatures being over 250° F. and/or evaporator (slurry) temperatures being over 155° F.

In every case in which a vacuum of less than 25 inches Hg was used, the stability was seriously affected though recovery efficiency was not.

EXAMPLES 20–22

Example 20 in Table III is an anomaly to the stability rule that steam temperatures over 250° F. and/or evaporator (slurry) temperatures over 155° F. produce poor stabilities. The reason is that Example 20 had a steam temperature of 259° F. but exhibited an $Na_2S_2O_4$ loss rate of merely 0.17%/day at 35°–40° F.

Examples 19 and 20 represent additional anomalies that can be satisfactorily explained, based upon their history of NaOH addition. The slurry of Example 21, to which 5.0% NaOH was added immediately after evaporation, decomposed to a borderline degree in storage, but the slurry of Example 22, having no NaOH, decomposed excessively. It is consequently believed that stabilities of slurries prepared without added caustic are roughly comparable to those prepared by the standard procedure of adding caustic to the feed, provided that the caustic soda is added to the slurry immediately after evaporation. However, this technique does have the drawback that adding even relatively iron-free caustic soda to the slurry after it is made will produce a black floc, and it is most probable that some degree of stability is sacrificed by adding NaOH after the evaporation step. Example 22 is consequently a prime illustration that NaOH is important to slurry stability, and Example 21 indicates that it is much preferred to add the caustic soda to the feed for the evaporator.

Unlike the effect of caustic soda upon storage stability of the slurries, there has appeared to be no dependency upon the chelating agents which were tested, as demonstrated by Example 9 as compared to Example 8. The prime function of chelating agents appears to be to retard or eliminate the formation of black hydrosulfite slurries caused by metallic contamination.

ADDITIONAL EXAMPLES

Satisfactory slurries have also been prepared by evaporation under vacuum in the thin-film processor from sodium dithionite solutions which had been made by: (a) in-situ reaction of sulfur dioxide, caustic soda, and sodium borohydride at a pH of approximately 6.5 and subsequent addition of a chelator and sufficient caustic soda to raise the pH to 10.5; and (b) reacting a sodium amalgam with sodium bisulfite and utilization with caustic soda to produce a 13.2% solution of sodium dithionite (this solution is sold under the trademark Reductone by Olin Corporation). The sodium dithionite contents of the resultant slurries were: (a) 25.2%; and (b) 31.4%. The sodium dithionite recoveries were: (a) 98%; and (b) 97.7%. Upon storage for 28 days at 35°–40° F., stability tests of these slurries indicated the following average decomposition rates per day: (a) 0.25%; and (b) 0.19%.

Because it will be readily apparent to those skilled in the bleaching art that innumerable variations, modifications, applications, and extensions of the discovery hereinbefore disclosed can be made without departing from the spirit and scope of the invention, what is herein defined by such scope and is desired to be protected should be measured, and the invention should be limited, only by the following claims.

What is claimed:

1. A process for producing a substantially stable sodium dithionite slurry having a sodium dithionite content of 25–45%, comprising:
    A. evaporating a sodium dithionite solution in an evaporator or crystallizer under a vacuum of 25–30 inches Hg, a steam heating jacket temperature of 220°–250° F., and a slurry temperature of 110°–155° F. to create a hot slurry; and
    B. cooling said hot slurry promptly while under agitation to create said stable slurry, wherein NaOH is either added to said solution before said evaporating or added immediately following said evaporating of said solution in an amount of 4–5% by weight of said sodium dithionite.

2. The process of claim 1, wherein said NaOH is 4.3% of said sodium dithionite by weight.

3. The process of claim 1, wherein a chelator is added to said solution to prevent metal contamination of said slurry.

4. The process of claim 1, wherein said steam temperature is 235°–250° F.

5. The process of claim 1, wherein said slurry temperature is 135°–145° F.

6. The process of claim 1, wherein said vacuum is 26.5–27.5 in. Hg.

7. The process of claim 1, wherein said solution is fed to said evaporator or crystallizer at 65–85 pounds/hr.-ft² of evaporative surface.

8. The process of claim 1, wherein said slurry has a density ranging from 1.498 g/ml at 34.6% sodium dithionite by weight to 1.624 g/ml at 42.3% sodium dithionite by weight.

9. The process of claim 8, wherein said slurry has a sodium dithionite content of 30–35% by weight.

* * * * *